(12) United States Patent
Monk et al.

(10) Patent No.: US 10,888,085 B1
(45) Date of Patent: Jan. 12, 2021

(54) SPECIES PATTERN EVALUATION

(71) Applicants: Harold Monk, Pride, LA (US); Jason Ray, Denham Springs, LA (US)

(72) Inventors: Harold Monk, Pride, LA (US); Jason Ray, Denham Springs, LA (US)

(73) Assignee: WiseEye Technology LLC, Pride, LA (US)

( * ) Notice: Subject to any disclaimer, the term of this patent is extended or adjusted under 35 U.S.C. 154(b) by 0 days.

(21) Appl. No.: 16/510,679

(22) Filed: Jul. 12, 2019

Related U.S. Application Data (60) Provisional application No. 62/789,763, filed on Jan. 8, 2019.

(51) Int. Cl.

| | | |
|---|---|---|
| A01M 31/00 | (2006.01) |
| G06K 9/00 | (2006.01) |
| G06N 5/04 | (2006.01) |
| H04N 5/247 | (2006.01) |
| G06K 9/62 | (2006.01) |
| G06T 7/70 | (2017.01) |
| G06F 3/14 | (2006.01) |
| G06F 16/51 | (2019.01) |
| G06T 7/292 | (2017.01) |

(52) U.S. Cl.
CPC ............. *A01M 31/002* (2013.01); *G06F 3/14* (2013.01); *G06F 16/51* (2019.01); *G06K 9/00362* (2013.01); *G06K 9/00771* (2013.01); *G06K 9/6267* (2013.01); *G06N 5/048* (2013.01); *G06T 7/70* (2017.01); *H04N 5/247* (2013.01); *G06T 7/292* (2017.01); *G06T 2207/30232* (2013.01)

(58) Field of Classification Search
None
See application file for complete search history.

(56) References Cited

U.S. PATENT DOCUMENTS

| | | | |
|---|---|---|---|
| 9,295,225 B2 | 3/2016 | Monk et al. | |
| 10,292,363 B2 | 5/2019 | Monk | |
| 10,674,703 B2 | 6/2020 | Monk | |
| 2016/0227736 A1* | 8/2016 | Monk | A01M 29/24 |
| 2018/0239991 A1* | 8/2018 | Weller | G06F 17/18 |
| 2019/0012535 A1* | 1/2019 | Collins | H04N 7/183 |
| 2020/0110946 A1* | 4/2020 | Kline | H04N 5/23206 |

* cited by examiner

*Primary Examiner* — Talha M Nawaz
(74) *Attorney, Agent, or Firm* — John B. Edel; Edel Patents LLC (57) ABSTRACT

Methods of evaluating animal activity relating to wildlife areas are disclosed that include running a digital classification routine to recognize particular species in a series of images. From those images data records are developed having the ability to identify timing information, the species, the location, celestial characteristics and atmospheric characteristics. The data records are analyzed to establish correlations between various associated features and the presence of the particular species. Data associated with future celestial characteristics and atmospheric characteristics is obtained and estimated probabilities of future appearances of the particular species are calculated and provided.

17 Claims, 3 Drawing Sheets

SPECIES PATTERN EVALUATION

This application claims the benefit of provisional application No. 62/789,763 filed on Jan. 8, 2019 and entitled Species Pattern Evaluation.

Methods of evaluating the patterns of species within the habitat described herein may be used in wildlife conservation, for wildlife feeding, animal watching and for hunting. Certain embodiments disclosed herein may provide predictive estimates of the probability of a certain species being present during a future time period.

DETAILED DESCRIPTION

Example Set 1

Figure 1:
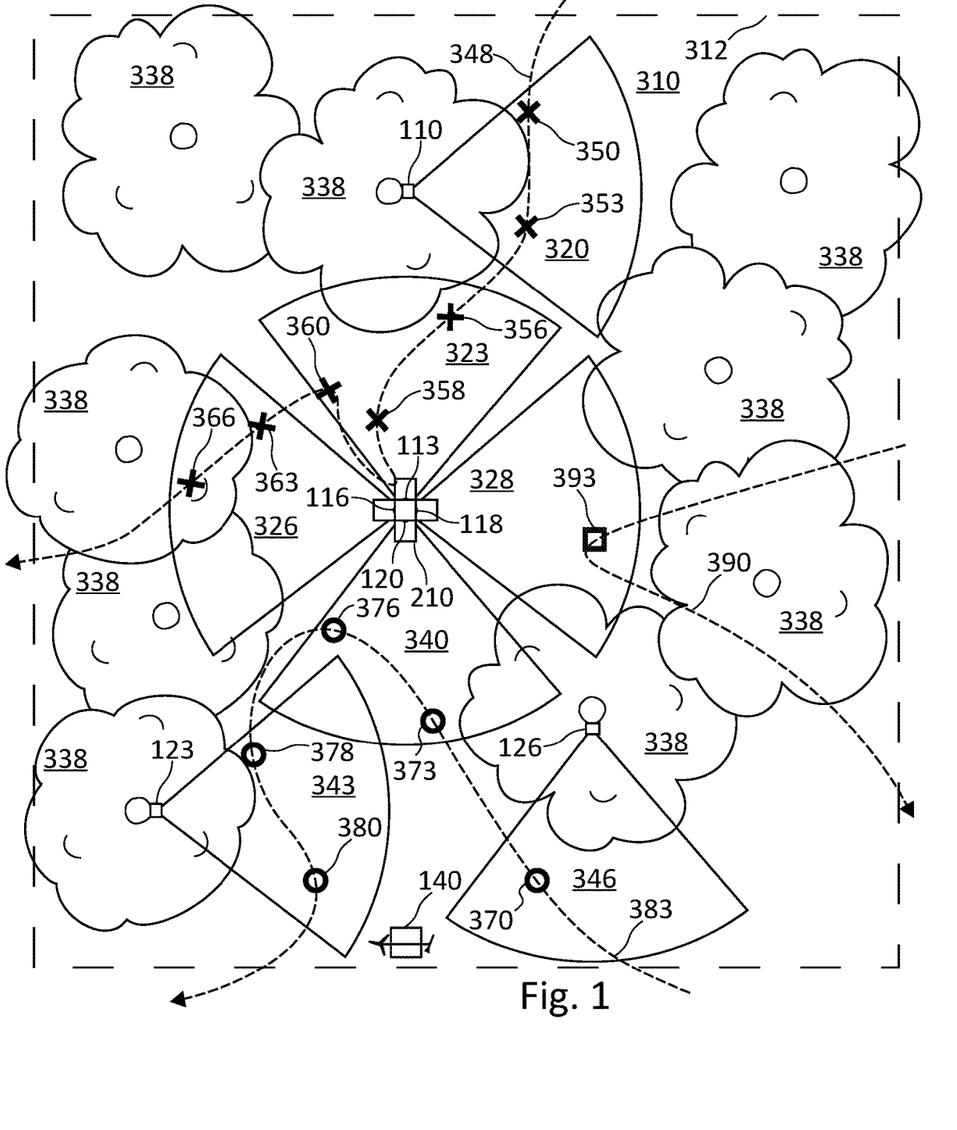
FIG. 1 shows an animal activity area

FIG. 1 of the drawings depicts a First camera 110, a Second camera 113, a Third camera 116, a Fourth camera 118, a Fifth camera 120, a Sixth camera 123, a Seventh camera 126, Weather station 140, Feeder 210, Animal activity area 310, Animal activity area boundary 312, First camera plot 320, Second camera plot 323, Third camera plot 326, Fourth camera plot 328, Tree 338, Fifth camera plot 340, Sixth camera plot 343, Seventh camera plot 346, a First animal path 348, a First animal path first location 350, a First animal path second location 353, a First animal path third location 356, a First animal path fourth location 358, a First animal path fifth location 360, a First animal path sixth location 363, a First animal path seventh location 366, Second animal path first location 370, Second animal path second location 373, Second animal path third location 376, Second animal path fourth location 378, Second animal path fifth location 380, Second animal path 383, Third animal path 390, and Third animal path first location 393.

First camera 110 may be located on Tree 338 and it may monitor First camera plot 320 within Animal activity area 310. Second camera 113 along with Third camera 116, Fourth camera 118 and Fifth camera 120 may be located on Feeder 210, which may be either a conventional feeder or a feeder having species recognition capabilities. Second camera 113, Third camera 116, Fourth camera 118 and Fifth camera 120 may be directed to monitor Second camera plot 323, Third camera plot 326, Fourth camera plot 328 and Fifth camera plot 340 respectively. A variety of Trees 338 along with other foliage and terrain may be present within Animal activity area 310. Sixth camera 123 may be positioned on a Tree 338 such that it is directed to monitor Sixth camera plot 343. Seventh camera 126 may be positioned on a Tree 338 such that it is directed to monitor Seventh camera plot 346. Weather station 140 may be used to gather additional contextual data. Weather station 140 may include equipment capable of monitoring temperature, humidity, barometric pressure, wind speed, wind direction, dewpoint, rainfall, ultraviolet radiation levels and visible radiation levels and may be configured to either record or communicate such information over time in a manner that would allow the matching of camera data to data gathered from Weather station 140 on a date and time basis. Animal activity area 310 is bounded by Animal activity area boundary 312 and Animal activity area 310 may represent a general area in which a person is interested in tracking the presence of one or more species. Each of First camera plot 320, Second camera plot 323, Third camera plot 326, Fourth camera plot 328, Fifth camera plot 340, Sixth camera plot 343 and Seventh camera plot 346 represent individual areas within Animal activity area 310 that may overlap but that do not need to overlap. The presence of multiple plots within Animal activity area 310 allows for the position-based tracking of animals of individual species. Depending on the system capabilities the monitoring of individual animals may be tracked back to a plot generally or may be identified as being in a particular area within the plot. First animal path 348 represents a path along which a first animal may travel. First animal path first location 350, First animal path second location 353, First animal path third location 356, First animal path fourth location 358, First animal path fifth location 360, First animal path sixth location 363 and First animal path seventh location 366 are each positions along the First animal path 348 within individual plots being monitored by the cameras. Similarly, a second animal may move through Animal activity area 310 along a Second animal path 383. Second animal path first location 370, Second animal path second location 373, Second animal path third location 376, Second animal path fourth location 378, Second animal path fifth location 380 are each positions along the Second animal path 383 within individual plots being monitored by the cameras. Further, a third animal may move through Animal activity area 310 along a Third animal path 390. Third animal path 390 Third animal path 390 may contain a Third animal path first location 393 representing a location within Fourth camera plot 328.

By way of example, First animal path 348 may represent the path of a first deer traveling through Animal activity area 310, Second animal path 383 may represent the path of a wild boar traveling through Animal activity area 310 and Third animal path first location 393 may represent the path of a second deer traveling through Animal activity area 310. Table 1 below represents a data set that may reflect the paths of those animals through Animal activity area 310.

TABLE 1

| Image | Location | Animal | Time |
| --- | --- | --- | --- |
| CM01-20180709094740.jpg | 30.680681, −91.227697 | Deer | Jul. 9, 2018 09:47:40 CDT |
| CM01-20180709094840.jpg | 30.680681, −91.227697 | Deer | Jul. 9, 2018 09:48:40 CDT |
| CM02-20180709094915.jpg | 30.680169, −91.227594 | Deer | Jul. 9, 2018 09:49:15 CDT |
| CM02-20180709095015.jpg | 30.680169, −91.227594 | Deer | Jul. 9, 2018 09:50:15 CDT |
| CM02-20180709095115.jpg | 30.680169, −91.227594 | Deer | Jul. 9, 2018 09:51:15 CDT |
| CM03-20180709095205.jpg | 30.679680, −91.228121 | Deer | Jul. 9, 2018 09:52:05 CDT |
| CM03-20180709095305.jpg | 30.679680, −91.228121 | Deer | Jul. 9, 2018 09:53:05 CDT |
| CM07-20180709113052.jpg | 30.677377, −91.226624 | Wild boar | Jul. 9, 2018 11:30:52 CDT |
| CM05-20180709113245.jpg | 30.678223, −91.228066 | Wild boar | Jul. 9, 2018 11:32:45 CDT |
| CM05-20180709113345.jpg | 30.678223, −91.228066 | Wild boar | Jul. 9, 2018 11:33:45 CDT |
| CM06-20180709113427.jpg | 30.677928, −91.228981 | Wild boar | Jul. 9, 2018 11:34:27 CDT |
| CM05-20180709113527.jpg | 30.677928, −91.228981 | Wild boar | Jul. 9, 2018 11:35:27 CDT |
| CM05-20180709142218.jpg | 30.679681, −91.226192 | Deer | Jul. 9, 2018 14:22:18 CDT |

The animal activity area may be an area where there are a variety of species that interact with one another or species that have activity patterns that correspond to some extent on the activity patterns of other species in the area. Such relationships may include predator prey relationships and other relationships such as shared feeding patterns or common dietary needs. For example, the likelihood of a herbivore being present may be negatively correlated with the presence of either a carnivore or omnivore. In certain examples, three or more cameras are present in the animal activity area. In a related set of examples, four or more cameras are present in the animal activity area. In many cases a hunting stand or an observation point from which humans may observe wildlife is present in the animal activity area. In many such cases the hunting stand her observation point is arranged to view one or more plots that are monitored by the cameras.

In certain examples the cameras are set up to have wireless antennas arranged and configured to relay data from one camera in a manner sufficient to minimize human activity in the animal activity area. In certain such cases data may be relayed to a single camera or other device from which a user wirelessly retrieves the data. The positioning of the cameras and any other devices involved in the relaying of information may be configured such that a human gathering the data need not enter the animal activity area. This may be accomplished in a variety of ways including placing a camera or other data relay device having wireless communication capabilities close enough to a human accessible area outside of the animal activity area that the human accessible area is within wireless communication range of the camera or data relay device. In many such cases the distance between wireless communication devices in the data relay network is less than ½ mile. In another embodiment, data is relayed to a camera or other device having cellular communication capabilities and that device communicates the data to a user accessible device such as a cellular phone, computer, tablet or server. The data collected and conveyed to the user may include photographs in bulk, photographs of animals recognized as belonging to a preferred group of species being tracked or data relating to animal activity that does not contain photographs and combinations thereof.

In many cases an animal feeder may be in the animal activity area. The feeder may have a camera associated with it. In cases where the feeder has an associated camera, that camera may have species recognition capabilities. A variety of other automated or non-automated feeders and animal attractants, including salt attractants, may be used to enhance the animal activity in animal activity area.

Cameras in the animal activity area may be directed to individual plots through which animals are likely to traverse. Such plots may include trails, clearings, other suitable terrain and portions thereof. Cameras may be arranged to photograph those plots based on detected motion in the plots and those cameras may take at least one photograph every 30 seconds during periods of identified motion.

Data generated, handled, processed and used by the system disclosed herein may be handled by a computer application, a portable device application, servers and/or software/hardware combinations residing on any number of devices disclosed herein. In one example, the species recognition may be conducted by the individual cameras within an animal activity area that monitor that animal activity area.

In certain examples, animal recognition being conducted by the individual cameras within an animal activity area may serve to generate data of predictive value relating to the species present and simultaneously be used to selectively feed one or more species to the exclusion of all other species. Measures that may be activated and deactivated by the individual cameras within an animal activity area may include engaging and disengaging one or more electrical shock deterrents and opening and closing feeder doors.

Figure 3:
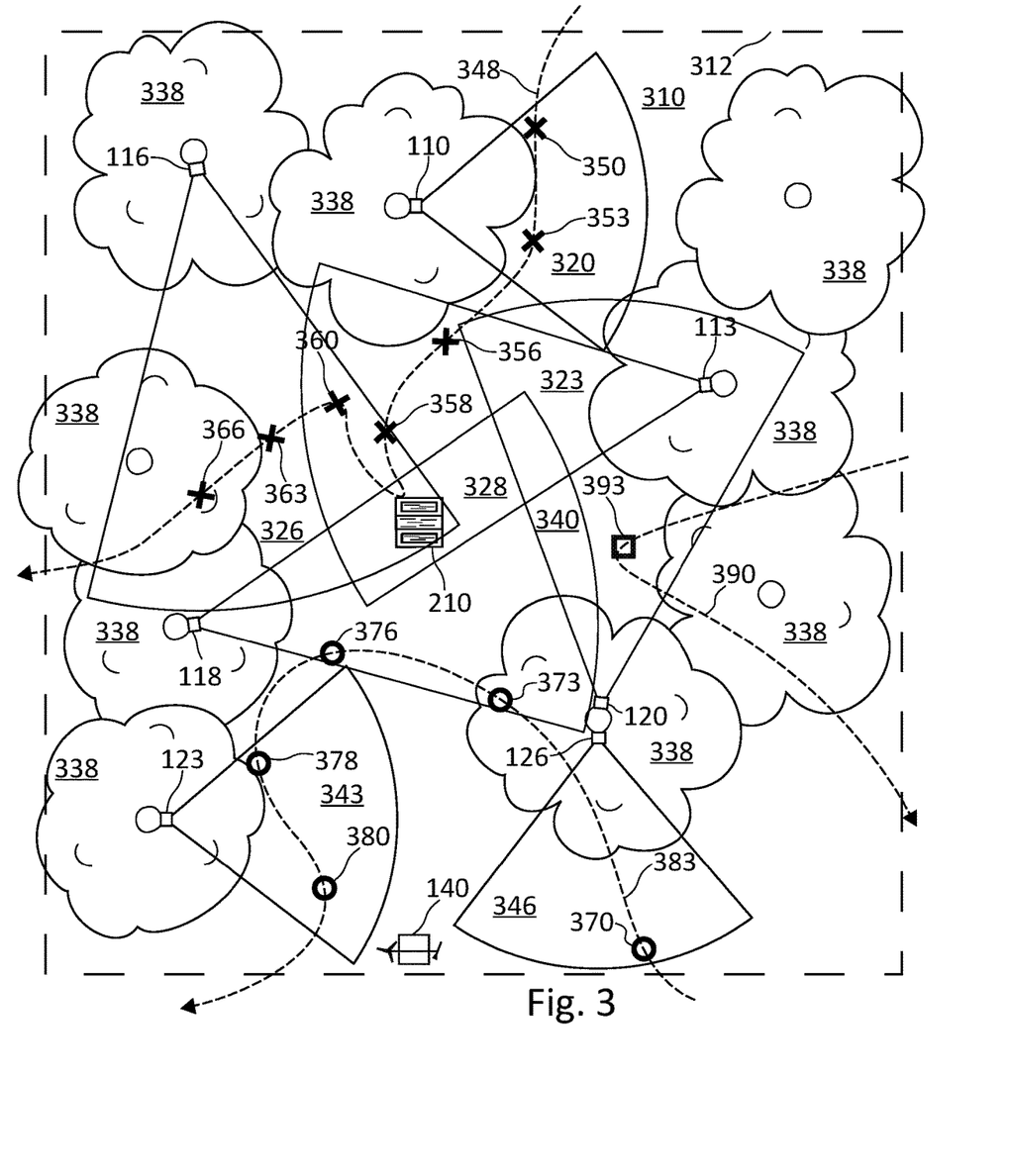
FIG. 3 shows an animal activity area

FIG. 3 of the drawings depicts: First camera 110, Second camera 113, Third camera 116, Fourth camera 118, Fifth camera 120, Sixth camera 123, Seventh camera 126, Weather station 140, Feeder 210, Animal activity area 310, Animal activity area boundary 312, First camera plot 320, Second camera plot 323, Third camera plot 326, Fourth camera plot 328, Tree 338, Fifth camera plot 340, Sixth camera plot 343, Seventh camera plot 346, First animal path 348, First animal path first location 350, First animal path second location 353, First animal path third location 356, First animal path fourth location 358, First animal path fifth location 360, First animal path sixth location 363, First animal path seventh location 366, Second animal path first location 370, Second animal path second location 373, Second animal path third location 376, Second animal path fourth location 378, Second animal path fifth location 380, Second animal path 383, Third animal path 390 and Third animal path first location 393. First camera 110, Second camera 113, Third camera 116, Fourth camera 118, Fifth camera 120, Sixth camera 123 and Seventh camera 126 may each monitor animal activity within the Animal activity area boundary 312. Weather station 140 may gather local weather and environmental information. Feeder 210 may be a conventional animal feeder, or it may be a feeder with a wireless communication antenna configured to communicate with cameras in the Animal activity area boundary 312. As depicted, Feeder 210 is a two door feeder with wireless communication capability and an electrical shock deterrent that operates in response to instructions to the nearby cameras. Feeder 210 may have the capability to engage and disengage one or more electrical shock deterrents and open and close its feeder doors based on the presence or absence of various species recognized by the cameras and may further be able to operate those and other features based on other information gathered by the system and predictions made by the system. Animal activity area 310 has Animal activity area boundary 312 within which the cameras are situated. Each of the cameras may be mounted on a Tree 338 or other objects stable enough for mounting. First camera plot 320, Second camera plot 323, Third camera plot 326, Fourth camera plot 328, Fifth camera plot 340, Sixth camera plot 343 and Seventh camera plot 346 are the areas monitored by the respective cameras and those plots may overlap. In particular, the individual plots may overlap in the area immediately surrounding Feeder 210. This overlap may allow for monitoring of the full surroundings of Feeder 210 including the area immediately adjacent to Feeder 210 which may be difficult to capture by cameras mounted on Feeder 210. In an example in which a deer traverses First animal path 348, First camera 110 may capture photograph or video record the deer at First animal path first location 350 and First animal path second location 353. In doing so, First camera 110 may evaluate the images to ascertain that the deer is a deer. If deer is the species that is targeted for feeding and Feeder 210 is configured to have closed doors by default and to have an electrical shock deterrent armed by default, First camera 110 may then instruct Feeder 210 to disarm the electrical shock deterrent and open the feeder doors so that those doors may be open in the event that the deer approaches the feeder. If deer is the species that is targeted for feeding and Feeder 210 is configured to have open doors by default and to have an electrical shock deterrent disarmed by default, First camera 110 may then either by instruction or omission of instruction have Feeder 210 maintain the disarmed electrical shock deterrent and open feeder doors so that those doors may be open in the event that the deer approaches the feeder. In an alternate scenario in which the animal traversing First animal path 348 were an animal not targeted for feeding such as a wild boar, First camera 110 would conduct species recognition on the animal and instruct Feeder 210 to either achieve or maintain a non-feeding deterrent status. That nonfeeding deterrent status may include having the doors to the feeder closed and having the electrical shock deterrent armed. When the deer passes First animal path third location 356 Second camera 113 may capture the presence of the deer, recognize the species and communicate instructions to Feeder 210 so that the feeder remains ready to feed the deer. Appropriate delays may be utilized within the system of cameras and feeder such that when the deer passes into areas not within the view of any camera that the feeder may remain ready to feed the deer for a period of time which may be a preset period of time. If no deer or other animal is detected by any of the cameras and the period of time elapses Feeder 210 may return to its default state. First animal path fourth location 358 and First animal path fifth location 360 are located in the immediate vicinity of the feeder and are located within the field of view of both Second camera 113 and Third camera 116. In circumstances when an animal is identified by two cameras simultaneously, that information may be utilized to more precisely indicate the location of the animal. Also, in circumstances where the species being fed is not disturbed by sounds such as the opening of doors on Feeder 210, Feeder 210 may delay opening until an animal targeted for feeding is identified as being adjacent to Feeder 210. Returning to the example in which a deer traverses First animal path 348, that deer may then pass through First animal path sixth location 363 and First animal path seventh location 366 after which it may disappear from the field of view of any camera. After disappearing from the field of view and the passage of an appropriate period of time, the feeder may return to a default state.

A second animal may traverse the Second animal path 383. That second animal may be a predator of a species selected for feeding. For example, the second animal may be a coyote when the species selected for feeding is a deer. Upon the second animal reaching Second animal path first location 370, Seventh camera 126 may recognize the second animal as an animal that should not be fed and instruct Feeder 210 to close the feeder doors and to arm the shock deterrent. The selection of when to carry out instructions relating to the opening and closing of doors on the feeder and to the arming and disarming of the shock deterrent on the feeder may differ depending on the species being targeted for feeding and the nature of the species not targeted for feeding. For example, if deer are being fed, Feeder 210 may close its feeding doors as soon as a predatory species is identified within Animal activity area 310, but wait to activate the electric shock deterrent until the predatory species is identified within a plot that encompasses Feeder 210. Namely, the electric shock deterrent may arm itself in response to any of Second camera 113, Third camera 116 and Fourth camera 118 identifying the presence of the predatory species. Thus, the presence of a predatory species at Second animal path second location 373 or Second animal path third location 376 may lead to the arming of the electrical shock deterrent. As the predatory species traverses through Second animal path fourth location 378 and Second animal path fifth location 380 and eventually disappears from the view of any camera in Animal activity area boundary 312, Feeder 210 may return to its default configuration. A third animal for example, may traverse Third animal path 390 and be identified as either a member of the species to be fed or a member of a species that is not to be fed when located at Third animal path first location 393. Because Fifth camera plot 340 does not encompass Feeder 210, but is near to Feeder 210 depending on the user preference or settings for the system the deer at Third animal path first location 393 may be handled in a manner similar to either plots that encompass Feeder 210 or plots that are more distant from Feeder 210. The selection of which cameras have which impact on the behavior of Feeder 210 may be done based on the geographic location of the cameras relative to the location of the feeder or based on the geographic location of the plots monitored by the cameras.

Systematic decisions may be made in furtherance of goals such as the feeding of deer to the complete exclusion of other animals. Such systematic decision making may be programmed into the cameras and account for the location of either the plots or the cameras. For example, Feeder 210 may remain open so long as the weather conditions would not contribute to the spoilage of food and so long as no other animals are identified by any of the cameras within Animal activity area 310. When a non-deer species is identified by a camera within Animal activity area 310 the doors of Feeder 210 may close until no non-deer species have been identified within Animal activity area 310 for a period of five minutes. If a non-deer species is identified in a plot that is within 100 feet of Feeder 210 the shock deterrent may be activated and remain activated until no non-deer species have been identified within any of those plots for a period of five minutes. These examples of feeder and camera interaction have wide ranges of applicability and may cover examples as simple as a single camera monitoring a single feeder to examples having large numbers of camera and feeders covering multiple animal activity areas.

Errors in animal recognition may take many forms including false positives, false negatives and identification of an animal as being a member of an incorrect species group. An error reporting system may be integrated into user interface allowing either the reporting of such errors to a central database or administrator of the central database for further optimization of the species recognition system. In another embodiment, which may occur independently or in conjunction with central reporting, the user would identify the error or the correct identification that should have been reported by the species recognition device to the user interface allowing for a local further optimization of the species recognition system.

Images from the various cameras may be taken in response to motion identified by those cameras. Recognition software may be used to identify individual animals as members of a particular species in a variety of ways. In one example, each individual camera contains the hardware and necessary program to identify the members of a particular species in a manner sufficient to develop a record set for that camera sufficient to at least identify the species and the time at which the image of the species was captured. In another example, the collection of pictures is transferred to a device having those capabilities which would utilize recognition software to identify the pictures having individual animal species and identify those species in a manner sufficient to associate the animal containing pictures with a time and place. Time date stamps or some other equivalent piece of information sufficient to identify when a picture was taken would typically be associated with the record of the presence of the species. Location information may be gathered in a variety of ways including identifying the GPS location of the camera, identifying the GPS location of the camera along with a direction the camera was pointing, identifying the GPS location of a camera with a phone or other GPS capable device, identifying a plot being monitored with a phone or other GPS capable device or by selecting a location on a map such as a digital map that may be electronically accessed. The data necessary to identify the time, place and picture depicting the species that were present may be stored in a database, organized in a folder system, stored in a text file, stored in image file names or preserved by other means sufficient to preserve that information for later evaluation. The later evaluation of that data may be used to predict the probability of a particular species appearing at a particular time. Using FIG. 1 as a reference, the probability of an animal of a particular species appearing within the animal activity area during a future time period may be evaluated or the probability of a particular species appearing within an individual plot during a future time period may be evaluated.

A variety of application programming tools and interfaces may be used in the recognition of species. Among the image recognition capable application programming interfaces that may be used are the DeepDream computer vision program by Google Inc., the OpenCV library from https://opencv.org/, TensorFlow software library by Google Inc., Cloud Vision API by Google Inc., Clarifai API by Clarifai, Inc. of 137 Varick Street, 3rd Floor, NY, NY 10013, Amazon Rekognition software by Amazon.com, Inc. by 410 Terry Ave. North, Seattle, Wash., 98109-5210. Google Inc. is located at 1600 Amphitheatre Parkway, Mountain View, Calif., U.S.

The analytical step of recognizing individual species may occur within a camera or on a separate device. Similarly, the providing of information, feedback and reports utilizing data described herein may be presented on any device having a user interface.

The identification of species as described herein commonly refers to species as may be identified in a biological sense, but the data gathering, data analysis, data reporting, recognition and predictive work conducted may be broken down into much smaller identified groups which may be referred to as sub species. For example, and identified species, such as deer, may be broken down into a variety of categories, such as buck, doe, and fawn. Categories and identifications by recognition need not be mutually exclusive. For example, deer may be classified as being with antlers and without antlers in addition to other features. Further, recognition may extend beyond simple classification and include grading or other measurements. For example, a Boone and Crockett score may be predicted based on a picture of a buck. It should be understood that any descriptions of species recognition and the handling of associated data includes the possibility of to recognition of smaller identified groups such as sub species and of such grading as alternate embodiments of the describe recognition and data handling.

The data set gathered may be presented to the user of that data in a variety of ways. Examples of such presentation include bar charts showing the prevalence of individual species over a series of daily time periods and bar charts comparing the species activity for a series of daily time periods across a span of multiple days. Bubble charts plotted over a map of the animal activity area may be used to show the prevalence of particular species at different plots with the animal activity area and other presentation methods having the capability of selecting time periods and different species for display may also be used. In another example, an animation may be used to graphically indicate a potential path or the paths that an animal or multiple animals may have taken through the animal activity area in a way that shows the time dependence of the various animals presence within the plots Local weather data such as temperature, pressure, humidity and wind speed may be used to enhance the data set and display the activity of a particular species relative to such factors. For example, plots or other outputs may be generated to display the number of deer identified for particular time period when the temperature is above 80° F. with a separate plot or output for the same time. Displaying the number of deer identified when the temperature is below 80° F. Weather data may be gathered directly from data produced by a weather station such as Weather station 140 or it may be gathered from a source such as Internet reports of weather from a nearby weather station.

The data set may further be enhanced by solar data, lunar data, cloud cover information and a variety of other factors experienced by the animals present. Information gathered from secondary sources may include information such as moon phase, sunrise time, sunset time. Examples of solar data may include data indications of day or night, indications of solar altitude (measured for example in degrees) and/or Azimuth (measured for example in degrees). Examples of lunar data may include data indications of whether or not the moon is visible, indications of lunar altitude (measured for example in degrees), Azimuth (measured for example in degrees), moon phase, percentage of the moon that is illuminated. Similarly, cloud cover data may be added to the data set.

An example of the types of data that may be included in an individual image data set that is part of a larger data set made up of many individual image data sets that may be analyzed for predictive purposes is presented below in Table 2.

TABLE 2

| Data Type | Example |
| --- | --- |
| image filename | CM02-20180709094915.jpg |
| GPS location | 30.680169, −91.227594 |
| Identified species | Deer |
| Identified animal subgroup | Buck |
| Time date stamp | Jul. 9, 2018 09:49:15 CDT |
| Temperature | 85° F. |
| Dew point temperature | 58° F. |
| Barometric pressure | 1.025 bar |
| Raining | No |
| Ultraviolet radiation index | 8 |
| Day/night | Day |
| Solar altitude | 26° |
| Lunar altitude | 155° |
| Moon phase | Full |
| Percentage of moon illuminated | 98% |

Data sets such as the data in Table 2 and a large number of variations containing similar data may be used as part of a data set used for prediction of animal activity.

Example animals that could be selected for identification include turkeys, black bears, whitetail deer, hogs, humans, birds, raccoons and squirrels. However, it should be understood that the set of potentially relevant species is as wide as the number of species in any particular animal activity area. Further, a broad list of species that may be tracked can be limited down to a smaller list of species relevant to the interest of a particular user in a way that information for which the user has no user interest is not presented to that user.

Figure 2:
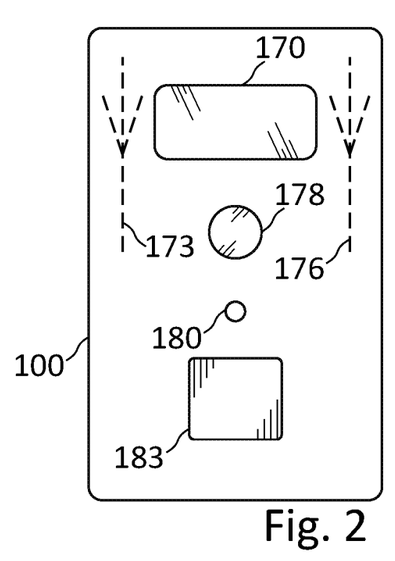
FIG. 2 shows a wildlife camera.

FIG. 2 of the drawings depicts Camera 100 which may comprise Flash 170, Communication antenna global positioning system antenna 176, Camera lens 178, Combination pressure, temperature and humidity sensor 180 and Motion detector 183.

Images may be viewed by plot, viewed by camera or by any of the other various criteria for which there is sortable data.

Animal activity plots may be generated based on the time of day. For example a bar chart of hourly deer activity may be generated. Similarly plots of animal activity by location may be generated including plots that show animal activity on a plot by plot basis.

A variety of notifications may be provided based on either the species recognition results or based on predictive evaluations made by the system. Such notifications may, for example be by text message to a cellular telephone or by email. The number of criteria on which such notifications may be based may be as large or nearly as large as the number of criteria and datatypes described herein. For example, a hunter may be notified each time a deer is identified. A similar notification may be provided whenever a deer with a particular Boone and Crockett score is identified. As a further example, a hunter may notified when the probability of seeing a deer on a particular plot or within the animal activity area exceeds a certain threshold probability. Such notices may, for example, include information such as "there is an estimated 65% probability that a deer will be in the animal activity area between 6 AM and 9 AM tomorrow morning." Further notifications may be provided when there is a identified two or three day pattern of animal activity.

Animal activity may be reported or displayed according to environmental factors such as the number of incidents of a particular animal when wind speed is above 10 mph.

Photos of animals may be displayed with additional contextual information such as temperature, relative humidity wind speed, wind direction barometric pressure, time picture was taken, date picture was taken, moon phase, sunrise time, sunset time, moonrise time, moon peak time, and moonset time.

The system may be configured to grant the user the ability to remotely erase pictures from wherever picture data is stored. Further the system may allow for the modification of the names of plots, the names of cameras and the ability to alter a variety of camera and system settings either remotely or at the camera through a variety of means including the operation of an application on a mobile device.

Data gathered may be subjected to a pattern evaluation through the use of data queries, evaluation of charts, evaluation of graphs and/or evaluation of other forms of reports based on the data set. Specific patterns may be identified. For example, it may be observed that most deer identified during nighttime hours are identified when the moon is visible and at least 70% illuminated.

After a sufficient quantity of data is accumulated, a selected group of individual components of the data set may be used as independent variables for correlation to predict the probability that a certain species will be present during a certain time period. Such correlations may be done by regression analysis which may include linear regression. The linear regression may involve a least squares regression or may involve other forms of linear regression. Nonlinear regression, nonparametric regression and other forms of regression are also contemplated.

Further, pattern recognition and predictive analysis may be conducted by artificial intelligence programs. Such programs may fulfill the purpose of evaluating an optimal time or time period for an animal of a particular species being present or the programs may evaluate a predictive analysis resulting in a probability of the appearance of an animal of a particular species during a time period.

Reports may be generated for individual species indicating the best time of day to see that particular species and a species by species report containing that information may be presented to the user. Such information and reports may be generated on a retrospective basis relying solely on historical information or may be generated through the use of predictive algorithms.

Particular adjustments to the probability of an individual species of animal being present at a future time may be adjusted based on the presence of a predatory species and the lingering scent of that predatory species. For example, the estimated probability of identifying a deer in a particular plot may be adjusted downward based on the recent identification of a coyote in a plot that is upwind of the plot for which the prediction is being made.

Adjustments to the probability of an individual species being present at a future time may be updated based on immediate recent sightings of animals of that species in nearby plots. By way of example, it is more likely that a deer will be identified in a particular plot if a deer was located in an adjacent plot a few minutes earlier.

A variety of negative correlation factors may be identified and used in the predictive algorithms. For example, if the presence of deer is negatively correlated with a temperature above 90° F. then the predictive algorithm could account for such a negative correlation. The presence of any number of species generally regarded as threatening to the species for which a prediction is being made would also be an event having a negative correlation that is useful for the prediction of the presence of the species. Similarly the presence of humans may have a negative correlation with the presence of a particular species and the identification of humans may be handled in a manner similar to the handling of other identified animals. Still further, human foot traffic, as opposed to vehicular traffic, may be identified as a negative correlating factor for the presence of individual animals due to the increased scent that may result from human foot traffic.

Cameras associated with this system may have GPS devices and those GPS devices may be used along with other communication equipment to track the location of the cameras if stolen.

Example Set 2

Given the significant potential size of the data set from which predictions of future animal activity can be made the number of predictive algorithms is nearly unlimited. The present example is a simple algorithm for the prediction of an estimated probability of a deer being identified during a three-hour period. For the purposes of this example, time blocks are designated as the eight three-hour periods of a day with the first time block being the period from 12 AM to 3 AM. An estimated probability of seeing one or more deer in the 12 AM to 3 AM time block of a third day is designated "y." That estimated probability, y, may be based on a data set from the first and second days along with an average or mean from the prior two weeks. The variable $x_1$ represents a binary, 1 or 0, answer to whether there was a deer identified in the preceding eight time blocks with 1 representing the answer that there was a deer identified in the animal activity area in the preceding eight time blocks. Namely, for a day-three first time block calculation, $x_1=1$ when at least one deer was identified in the animal activity area during day-two. The variable $x_2$ represents a binary, 1 or 0, answer to whether there was a deer identified in the eight time blocks that preceded preceding eight time blocks with 1 representing the answer that there was at least one deer identified in those time blocks. Namely, for a day-three first time block calculation, $x_2=1$ when at least one deer was identified in the animal activity area during day-one. The variable $x_3$ represents a binary, 1 or 0, answer to whether there was a deer identified in the time block eight time blocks ago, namely 12 AM to 3 AM on day two. The variable $x_4$ represents a binary, 1 or 0, answer to whether there was a deer identified in the time block 16 time blocks ago, namely 12 AM to 3 AM on day one. The variable $x_5$ represents a binary, 1 or 0, answer to whether there was a hog identified in the previous two time blocks, namely the 6 PM to 12 AM period of day-two immediately preceding the time block being predicted. The average or mean incidents of one or more deer being present during a time block over the preceding two weeks may be simply calculated by counting the number of time blocks in the previous 112 in which a deer was identified and dividing that number by 112. In this example, 17 time blocks having deer identifications in the prior two weeks results in M=0.152. Collectively the probability of seeing one or more deer in the 12 AM to 3 AM time block of a third day may be evaluated as according to Equation 1 below.

$$y=Ax_1+Bx_2+Cx_3+Dx_4+Ex_5+M \quad \text{(Equation 1)}$$

In Equation 1 the variables A, B, C, D, and E are correlation variables generally valued between −1 and 1. Those variables may be estimated or calculated based on regression analysis, artificial intelligence pattern matching, professional estimation, other comparable means and combinations thereof. Analysis of a significant data set of animal activity within the animal activity area may result in a set of correlation variables such as shown in Table 3 below:

TABLE 3

| | |
|---|---|
| A | 0.162 |
| B | 0.071 |
| C | 0.118 |
| D | 0.011 |
| E | −0.132 |
| M | 0.152 |

Thus, based on the correlation variables of Table 3, if the only activity in the animal activity area were a 1:05 AM deer sighting on day-one, a 2:45 AM deer sighting on day-two and 9:45 PM hog sighting on day-two the estimated probability of seeing one or more deer in the 12 AM to 3 AM time block of a third day would evaluate as follows:

$$y=(0.162)*1+(0.071)*1+(0.118)*1+(0.011)*1+(-0.132)*1+0.152=38.2\% \quad \text{(Equation 2)}$$

giving a 38.2% probability of seeing a deer during the 12 AM to 3 AM time block of a third day. Under a different set of circumstances using the same time periods, if the only animal identified over the 16 time blocks preceding the 12 AM to 3 AM time block of the third day was the 2:45 AM deer sighting on day-two, the 12 AM to 3 AM time block of a third day would evaluate as follows:

$$y=(0.162)*1+(0.071)*0+(0.118)*1+(0.011)*0+(-0.132)*0+0.152=43.2\% \quad \text{(Equation 3)}$$

The above example is presented to provide an example of how multiple factors may be accounted for in estimating a probability of a certain species being present. The example accounts for the presence of another species, namely that the recent appearance of a hog as being negatively correlated with the likelihood of seeing a deer. Correlation with a larger number of independent predictive variables is contemplated including a wider variety of animals, weather conditions, etc.

As that term is used herein "plot" includes, for example, fields, portions of trails, clearings and other areas traversable by land animals. Plots may also be only a portion of a field, clearing or other area within the habitat of an animal Further the phrase "threatening species" indicates a species that may pose some form of threat to the species being targeted for predictive analysis.

As that phrase is used herein "details sufficient to identify a location within the plot that is being monitored" includes for example a GPS location of a camera that includes an indication of the direction the camera was pointing for the relevant data point. A mere GPS position of the location of a camera without any indication of the direction the camera was pointing would not be considered to contain "details sufficient to identify a location within the plot that is being monitored" as that phrase is used herein.

Methods of counting deer may be used in conjunction with the equipment and methods described herein. For example, at a particular monitored location, deer may be fed for a period of 10 days and counted either during that 10-day period or during a 10-day period following the initial feeding period. The results of the counting may be used to estimate a total number of deer within a geographic region. For example, an estimate of the number of deer per 100 acres could be generated based on the observation and counting. It should be understood that while most of the examples described herein indicate recognition as being the recognition of a single deer or other species in an image, recognition techniques described herein may identify multiple deer or other species in a single image. Such recognition techniques may optionally be used to enhance the predictive abilities of any of the estimation techniques described herein.

A method of evaluating animal activity may, for example comprise positioning a first camera in an animal activity area wherein the first camera comprises a motion detector and wherein the first camera comprises a wireless communication antenna; positioning a second camera in an animal activity area wherein the second camera comprises a motion detector and wherein the second camera comprises a wireless communication antenna; monitoring a first plot for animal movement with the first camera; monitoring a second plot for animal movement with the second camera; identifying a first movement associated with a first animal; capturing a first image of the first animal at a first time using the first camera; performing species recognition on the first image of the first animal wherein the species recognition on the first image of the first animal is sufficient to associate the first animal with a first species group; creating a first species record having details sufficient to identify the first image, the first species group, the first plot and the first time; identifying a second movement associated with a second animal; capturing a second image of the second animal at a second time using the first camera; performing species recognition on the second image of the second animal wherein the species recognition on the second image of the second animal is sufficient to associate the second animal with a second species group such that the performing of the species recognition on the second image of the second animal is done by the first camera; creating a second species record having details sufficient to identify the second image, the second species group, the first plot and the second time such that the first species record has details sufficient to identify a location within the plot that is being monitored; conducting a probability evaluation that utilizes information from the first species record and the second species record to estimate a probability that a member of the first species group will be present at a location at a future time; generating a report that utilizes information from the first species record and the second species record to reflect the pattern of recent activity by the first species group and the second species group on a plot by plot basis.

A method of feeding and evaluating animals may, for example, comprise positioning a first camera in an animal activity area wherein the first camera comprises a motion detector and wherein the first camera comprises a wireless communication antenna; positioning a second camera in an animal activity area wherein the second camera comprises a motion detector and wherein the second camera comprises a wireless communication antenna; monitoring a first plot for animal movement with the first camera; monitoring a second plot for animal movement with the second camera; identifying a first movement associated with a first animal; capturing a first image of the first animal at a first time using the first camera; performing species recognition on the first image of the first animal wherein the species recognition on the first image of the first animal is sufficient to associate the first animal with a first species group; creating a first species record having details sufficient to identify the first image, the first species group, the first plot and the first time; operating an animal feeder based on the first species record wherein the feeder is located remotely from the first camera and the second camera; identifying a second movement associated with a second animal; capturing a second image of the second animal at a second time using the first camera; performing species recognition on the second image of the second animal wherein the species recognition on the second image of the second animal is sufficient to associate the second animal with a second species group; creating a second species record having details sufficient to identify the second image, the second species group, the first plot and the second time; changing the operational status of an electric shock deterrent in response to the second species record wherein the electric shock deterrent is a component of the feeder such that the first species record has details sufficient to identify a location within the plot that is being monitored and conducting a probability evaluation that utilizes information from the first species record and the second species record to estimate a probability that a member of the first species group will be present at a location at a future time. In a related example one or both cameras may monitor the feeder, the operation of the feeder may be controlled wirelessly by a network of three or more cameras located apart from the feeder and at least one camera that does not have the feeder in its field of view may provide instructions for the operation of the feeder. Further, a target species may be identified and the probability of seeing that target species may be predicted based on the presence of another species that threatens the target species. One or more of the cameras described may have infrared image capture capabilities. One or more of the cameras described may have a global positioning system receiver. The species recognition may take place on any of the cameras monitoring the area, on a remote server or on an electronic device associated with a user of the camera. In certain embodiments, either humans in general or human foot traffic in particular may be identified and there may be a corresponding reduction in the probability of identifying the target species based on the presence of human foot traffic. Such probability adjustments relating the presence of humans may be carried out according to the various methods described herein.

Example Set 3

Groups of photos, such as trail camera photos including pictures of white tail deer, may be uploaded to a server. The uploading may be facilitated by an application from a phone or other electronic device, may be uploaded through a website or may be uploaded directly from the device that takes the picture. A digital classification routine may then review each photo to recognize the deer and optionally other species of animals in a manner that associates the presence of the animals in the pictures with a time and geographic location. For example, a white tail deer may be identified at GPS location 30.680169, −91.227594 at 07/09/2018 09:49:15 CDT. Having time and geographic location information, such as GPS coordinates, additional historical weather data, solar data and lunar data associated with the particular location and time of each individual deer identification may be gathered from outside sources. That data may then be used to classify the prior sighting of the white tail deer into a number of categories which may include categories indicated in Tables 4-12. If there were 15 deer sightings at the location in the preceding two weeks, those deer sightings may be broken down into groups of weather classifications, windspeed classifications, wind direction classifications, barometric pressure classifications, temperature classifications, relative humidity classifications, daylight moonlight classifications, moon phase classification, and hour of day classifications.

TABLE 4

| Hour | Sightings | Hour | Sightings | Hour | Sightings |
|---|---|---|---|---|---|
| 12:00 AM | | 8:00 AM | | 4:00 PM | |
| 1:00 AM | | 9:00 AM | | 5:00 PM | |
| 2:00 AM | | 10:00 AM | 3 | 6:00 PM | 4 |
| 3:00 AM | | 11:00 AM | | 7:00 PM | 2 |
| 4:00 AM | 2 | 12:00 PM | | 8:00 PM | |
| 5:00 AM | | 1:00 PM | | 9:00 PM | 2 |
| 6:00 AM | 2 | 2:00 PM | | 10:00 PM | |
| 7:00 AM | | 3:00 PM | | 11:00 PM | |

TABLE 5

| Weather | Sightings |
|---|---|
| Mostly Cloudy | 3 |
| Few Clouds | 5 |
| Clear | 4 |
| Partly Cloudy | 2 |
| Overcast | |
| Fog | |
| Freezing Precipitation | |
| Frozen Ice precipitation | |
| Wintery Mix | |
| Rain | 1 |
| Thunderstorm | |
| Snow | |

TABLE 6

| Wind speed | Sightings |
|---|---|
| 0-2 mph | 8 |
| 3-5 mph | 4 |

TABLE 6-continued

| Wind speed | Sightings |
|---|---|
| 6-10 mph | 1 |
| 11-15 mph | 2 |
| >15 mph | |

TABLE 7

| Wind direction | Sightings |
|---|---|
| Out of North | 7 |
| Out of East | 8 |
| Out of South | 0 |
| Out of West | 0 |

TABLE 8

| Barometric pressure (millibars) | Sightings |
|---|---|
| 800-899 | |
| 900-949 | |
| 950-980 | |
| 981-990 | |
| 991-1000 | 4 |
| 1001-1010 | 8 |
| 1011-1020 | 3 |
| 1021-1030 | |
| 1031-1050 | |
| 1051-1100 | |

TABLE 9

| temperature | Sightings |
|---|---|
| <0° F. | |
| 0 to 10° F. | |
| 11 to 20° F. | |
| 21 to 30° F. | |
| 31 to 40° F. | |
| 41 to 50° F. | |
| 51 to 60° F. | |
| 61 to 70° F. | 1 |
| 71 to 80° F. | 8 |
| 81 to 90° F. | 6 |
| 91 to 100° F. | |
| 101 to 110° F. | |
| >110° F. | |

TABLE 10

| Relative humidity | Sightings |
|---|---|
| 0-20% | |
| 21-40% | |
| 41-60% | 5 |
| 61-80% | 7 |
| 81-100% | 3 |

TABLE 11

| Daylight/moonlight | Sightings |
|---|---|
| Day | 9 |
| Night (moon above horizon) | 4 |
| Night (moon below horizon) | 2 |

TABLE 12

| Moon phase | Sightings |
|---|---|
| New moon | |
| Waxing crescent | |
| First quarter | 6 |
| Waxing gibbous | 6 |
| Full moon | 3 |
| Waning gibbous | |
| Third-quarter | |
| Waning crescent | |

All of the characteristics described in table 4-12 may be classified as either as celestial characteristics or as atmospheric characteristics. Celestial characteristics may include any characteristics relating to the sun and moon and atmospheric characteristics may include any characteristic relating to weather, precipitation and the atmosphere. Celestial characteristics identified in the tables are non-binary characteristics and such non-binary characteristics may lead to more accurate predictions than binary characteristics such as day/night. Further, the characteristic data may come from sources other than the images taken by the cameras and in certain cases the characteristic data may be limited to sources other than the images taken. This can lead to greater accuracy as well. For example, sunrise/sunset data for a particular location is generally much more accurate than the data that can be inferred by the image.

The allocation of sightings within the groups of classifications may then be used to establish relative condition-based tendencies for the animal species being evaluated. In one method of evaluating the likelihood of the presence of the animal species points may be allocated based on raw number of sightings in each category counted as points. For example, using the data in Tables 4-12, points would be calculated as in Tables 13-14 below:

TABLE 13

| Condition | Sightings |
|---|---|
| 4 AM | 2 |
| Clear | 4 |
| 3-5 mph wind | 4 |
| Wind out of the East | 8 |
| 1001-1010 mbar pressure | 8 |
| 61 to 70° F. | 1 |
| 41-60% relative humidity | 5 |
| Night (moon above horizon) | 4 |
| Moon at first quarter | 6 |
| Total points | 42 |

TABLE 14

| Condition | Sightings |
|---|---|
| 5 AM | 0 |
| Partly Cloudy | 2 |
| 6-10 mph wind | 1 |
| Wind out of the North | 7 |
| 991-1000 mbar pressure | 4 |
| 61 to 70° F. | 1 |
| 61-80% relative humidity | 7 |
| Night (moon below horizon) | 4 |
| Full Moon | 0 |
| Total points | 26 |

Tables 13 and 14 are illustrative because there are millions of potential combinations of categories, each yielding their own point total. The primary significance of point totals is relative to other point totals. Using a point total method, an evaluation of the likelihood of seeing the relevant species under the conditions described in Table 13 would be higher than the likelihood of seeing the relevant species under the conditions described in table 14.

After evaluating the relative probability of seeing a white tail deer on a condition group by condition group basis, predictive weather, solar and lunar data may be gathered for the upcoming days. In one example, predictive data matching each hour for the following four days would be classified into categories matching the categories of Tables 4-12 such that the calculated point totals, such as those described in Tables 13 and 14, may be applied to each hour of the upcoming days. The data may then be plotted in a way that graphically depicts the relative probability of seeing a white tail deer at the location where the pictures were originally taken.

There are a wide variety of variations of the above described method for evaluating the relative probability of seeing an animal at a future time at a monitored location. The predictive techniques described herein may be used on any individual species of animal. Whitetail deer, turkeys, feral pigs and bears are examples of the species that may be monitored. The identification of species in the individual pictures from a camera may be done at the camera, at a computer or at a mobile device prior to having the data and or pictures subjected to one or more of the pattern evaluation techniques described herein.

The example described above is illustrative and may be varied in several ways such that the pattern evaluation is more detailed, less detailed or merely evaluated using a different set of factors. In a variation of this example set, the presence of predatory or other threatening species may be included in the relative probability analysis. When such instances occur that are negatively correlated with the presence of white tail deer points may be taken away from the relative probability score.

A large number of variations are envisioned for characterizing and categorizing weather and other atmospheric conditions. For example, instead of relative humidity, the wet bulb temperature and dry bulb temperature may be indicated and categorized. Further, the time period for gathering predictive data may be longer or shorter. For example, a year of pictures from a single trail camera may be what is analyzed to arrive at the data set that is the basis for the relative probability prediction.

While the calculations of the present example set are based on simple point totals, it should be understood that correlation factors or other methods of adjusting for the relative predictive strength of various classification groups of categories may be used. For example, the weather condition categories of Table 5 may be more strongly correlated with the presence of white tail deer than the wind speed categories of Table 6. In such cases, the points attributed to the weather condition category may be multiplied by a weather condition category correlation factor. There are a variety of mathematically equivalent and mathematically similar ways that such correlation factors may be applied to adjust for the relative predictive strength of the various classification groups. Further, estimation techniques from other example sets may be incorporated into the present example set in whole or in part.

The handling of categories for features like time classifications and weather classifications may be subject to wide variation regarding what is classified and how those classifications are handled. For example, instead of categorizing time into one-hour segments associated with the time of day, time segments may be broken up based on proximity to sunrise and sunset. In such an example, categories may include the first hour prior to sunset, the second hour prior to sunset, the first hour after sunset, the second hour after sunset, etc. Variations of this type, which more closely track potential observations of a deer or other animal being tracked, may increase the accuracy of the predictive techniques described herein.

While many of the probability assessments described in these examples are directed to a single camera, it should be understood that the same assessment techniques may be used to assess a group of cameras in a particular geographic area. For example, a group of five cameras on a hunting lease may be used to assess the future probability of a deer being sighted on the hunting lease. In such a case the sightings for the particular area may be subjected to a similar calculation routine as would occur for the handling of a group of pictures for a single camera. The geographic scope of the larger areas to be assessed is not particularly limited and may be assessed on an entire country or entire state basis. Regional and local conditions experienced by the deer create unique circumstances that can impact a deer's response to the weather, atmospheric, lunar and solar conditions. For example, on an individual hunting lease, one camera may be situated in an open field and the other camera may have view of a protected thicket. For that reason, it is contemplated that an individual camera predictive analysis may be done along with a local camera group predictive analysis which is further coupled with a regional predictive analysis. The combined predictive analysis may have greater predictive value for the location associated with an individual camera than the analysis of pictures associated with that individual camera in isolation from the other cameras. There are many potential ways to combine the local, area and regional predictive results to get a composite result. An arithmetic mean of the local, area and regional probabilities is one example of how an individual location prediction may be enhanced.

Example Set 4

Assessments of the probability of seeing an animal such as a white tail deer may be evaluated based on observed time-based rates of occurrence of those deer. The gathering of images, processing the images to recognize the relevant species and gathering of historical information may be carried out as presented in other examples. Utilizing the same groupings of conditions described in Tables 4-12, each individual classification from the categories may be evaluated to determine a total number of instances in which the deer were sighted and a total duration of the classified condition. For example, in a 14-day window, the 4 AM hour as shown in Table 4 would have a total of two sightings and a total duration of 14 hours yielding a 4 AM conditional citing rate of 0.143 sightings/hour. The total rate of deer sightings during the 14-day observation period would be 0.045 sightings/hour. Historical weather data retrieved from the Internet, a remote database, website or other source may be used to either calculate or estimate the total amount of time a particular condition existed during the period being evaluated. For example, it may be determined that mostly cloudy conditions prevailed for a total duration of 101 hours during the 14-day period. The rate of sightings per hour may then be calculated resulting in a value of 0.030 sightings/hour under mostly cloudy conditions. Utilizing this technique on the sightings described in Table 5, that table can be expanded to account for the sightings and the duration of individual conditions. Default values along with high and low limits on the resulting established sightings per hour result may be utilized to prevent unreasonably high and unreasonably low rates from populating the rate values, thereby limiting unnecessary inaccuracies. For example, for conditions with zero duration, the rate of sightings per hour may be set at a default value which may be the background rate of sightings per hour.

TABLE 15

| Weather | Sightings | Duration (hrs.) | Rate (sightings/hour) |
|---|---|---|---|
| Mostly Cloudy | 3 | 101 | 0.030 |
| Few Clouds | 5 | 64 | 0.078 |
| Clear | 4 | 25 | 0.160 |
| Partly Cloudy | 2 | 58 | 0.034 |
| Overcast | 0 | 14 | 0.000 |
| Fog | 0 | 19 | 0.000 |
| Freezing Precipitation | 0 | 0 | N/A (0.045 sightings/hour) |
| Frozen Ice precipitation | 0 | 0 | N/A (0.045 sightings/hour) |
| Wintery Mix | 0 | 0 | N/A (0.045 sightings/hour) |
| Rain | 1 | 20 | 0.050 |
| Thunderstorm | 0 | 35 | 0.000 |
| Snow | 0 | 0 | N/A (0.045 sightings/hour) |

If the time period being predicted was the 4 AM hour on the following day, which was predicted to have mostly cloudy conditions and a series of other matched classifications corresponding to Tables 4-12, the probability of sighting a deer may be evaluated according to the equation below.

$$R_t*W_t + R_w*W_w + R_s*W_s \ldots R_p*W_p = \text{Predicted Rate}$$

In that equation, $R_t$ represents the rate of sightings per hour for the 4 AM hour, which may for example be 0.110. $W_t$ represents the weighting factor associated with the time category which may be 0.05. $R_w$ represents the rate of sightings per hour for weather category being applied to the hour being predicted. Referring to Table 15, $R_w$ is 0.030 for the mostly cloudy conditions associated with the prediction. A rate and weighting factor may be applied for each of the nine categories such that a predicted rate is produced. For a one-hour period being predicted, dividing the predicted rate by the time would yield an estimated probability of seeing a deer during that period. Weighting factors may be calculated based on aggregated data derived from a larger set of sightings for the same species including data from a multitude of other cameras, may be estimated based on experience or may be developed by other methods. These weighting values may be used to indicate the relative predictive abilities of the various categories of classifications. In the above equation, the sum of all weighting factors may add up to 1.0.

In examples where the probability assessments are made on a server apart from the electronic devices owned and possessed by the user, various communications may be sent to the user by text message, through email, push notification, through a phone or computer applications or through other Internet communications. Such communications may occur on a periodic basis or when a certain probability threshold is met. Various notices may be provided such as: "This Thursday between 3 and 4 PM will be the best opportunity to see a white tail deer by camera 1." In order to accommodate such notices, a server may periodically conduct analysis for active or selected users using already available historical data and freshly updated forecast data to make the prediction. Any number of reports, charts or graphs may be provided in a similar fashion. Depending on the user preference, notifications reports, charts and graphs may be limited to daylight hours. Such limitations may be of interest to hunters.

While many activities such as species recognition, analyzing patterns and correlating conditions to the presence of particular species are often described as taking place on a server separate from the camera(s) and local devices used by a user/hunter, such activities may take place in a variety of locations including onboard the camera, within a users phone or portable electronic device or on the user/hunter's computer.

Localized historical and predictive weather data may be obtained from a third party service such as is available at https://darksky.net/. As that term is use herein "image" encompasses both photos and video and it should be understood that the recognition techniques and pattern matching techniques described herein may accept photos, videos or both as part of the predictive methods described.

Example Set 5

Evaluations comparable to those described in previous examples may be practiced with the aid of artificial intelligence tools. In a manner similar to that described in Example sets 3 and 4 above, an individual may provide a series of images from one or more cameras so that the images are digitally processed for the recognition of particular species within the series of images. In the process of doing so, a data set is generated that is sufficient to identify the time and location for each instance in which the animals were identified. Historical weather, solar and lunar data are then gathered so that a detailed attribute set may be associated with each instance of the particular species.

After the steps associated with the identification of the relevant species, a more detailed and granular data set may be utilized to evaluate future probabilities. Individual deer sightings, which may include the number of deer in a sighting may be included in the data set associated with a time date stamp as opposed to an indication of the hour in which the sighting occurred. Weather maybe indicated by category similar to previously described methods. Wind speed may be described by actual wind speed and a heading. For example, an individual deer sighting may contain data such as wind blowing at 5 mph from heading 110°. Barometric pressure and temperature may take the form of directly measured or estimated actual values rather than categories. Relative humidity may similarly be indicated as actual. While localized data received from outside sources may give simple details for celestial data, known calculation techniques may be used to convert simple celestial data into more useful and more predictive celestial data. For example, sunrise, sunset, moonrise, moonset and moon phase data for a particular location may be converted into features like solar altitude and percentage of visible illumination of the moon.

In one example, a fully granular detailed record of animal sightings for a historical time period coupled to the associated celestial and atmospheric conditions would be generated as a data set. In a related example, complete sets of celestial and atmospheric conditions would be obtained for the entire time period for which images were processed. As an example, celestial and atmospheric conditions for every half hour covering a one-month period of images may be obtained and the incidence of deer sighting would then be associated with the half hour by half hour data set. Data sets of either variety or other similar varieties may be used as the input for an artificial intelligence analysis.

That chosen data set, having celestial and atmospheric conditions along with the records of animal sightings may then be subjected to a neural network type artificial intelligence data analysis seeking patterns associated with the sightings of deer. The results of the artificial intelligence analysis may then be analyzed to identify correlation factors associated with the presence of the sighted animal species and weighting factors associated with the strength of correlation. From that information predictive tables, equations or other digital assessment tools may be developed. The tools may be similar to those identified in previous examples, but may also include correlations to more complicated factors. As an example, deer sightings may be correlated to combined factors such as the co-occurrence of rising temperature and falling barometric pressure. As previously indicated, the scope of data analyzed may vary and predictive tables, equations or other digital assessment tools associated with individual cameras may be combined with similar tools reflective of larger patterns, such as regional patterns.

After the artificial intelligence generated tools or tool generated based on the results of the artificial intelligence analysis are available, predictive weather data associated with a particular camera may be acquired and subjected to any calculations necessary to achieve a celestial and atmospheric condition data set comparable to the celestial and atmospheric condition data set that was processed by the artificial intelligence system. In a manner that may be similar to the methods described in examples sets 4 and 5, the correlation factors may be applied to the predicted weather data in a way that generates either estimated probabilities or estimated relative probabilities of sighting a deer at the location being analyzed.

The use of large databases and artificial intelligence permits pattern identification and predictive analysis on a scale that would otherwise be difficult to achieve. Machine learning environments that may be used for correlation and prediction relating to conditions include Tensor Flow and Keras available at https://keras.io/ (Original author, Francois Chollet). The OpenCV library at https://opencv.org/ and the YOLO library.

Example Set 6

A variety of reports may be generated for an end-user relating to the probability assessments or the reports may be generated by the end user based on a data set generated by techniques described herein. Example reports may include a simple indication of the highest probability time or time period of the targeted animal being present. Such results may for example be presented in a pie chart. Also, a multi-day forward-looking graph of either the probability or relative probability of seeing the targeted animal may be presented to the end-user. That graph may take the form of a bar chart, a line graph, a smooth curve or other similar data presentation. When a user has multiple camera locations, a map may be used to display the historical incidence of animal movement which may include representations of animal movement between cameras. Similarly, predictive reports may be produced on a map in a way that indicates the time-based probabilities of seeing the target species on the map. Further, a best time and place to hunt indication may be given as part of a map-based report or other non-map-based report. A simplified version of such a report may indicate that the best time and place to hunt. That identification may be by camera and time. For example, it may be indicated that the best time and place to hunt is in front of camera number three between 4 and 5 PM on Tuesday.

Various charts and graphs may be used to indicate the concentration of individual species sightings according to any number of variables described herein. Those charts and graphs may indicate the total number of animal sightings per category or may indicate the frequency of animal sightings per category. Users may be provided the ability to filter results by various categories. For example, a user may be able to generate a report indicating the other conditions most favorable for seeing a particular animal when it is raining.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

What is claimed is:
1. A method of evaluating animal activity comprising:
 a. running a neural network type artificial intelligence data analysis to recognize a first species of animal in a first image within a first series of images taken by a first camera at a first location;
 b. running the neural network type artificial intelligence data analysis to recognize the first species of animal in a second image within the first series of images taken by the first camera;
 c. creating a first data record having details sufficient to identify:
  i. a first time at which the first image was taken,
  ii. the first species of animal,
  iii. the first location,
  iv. a first celestial characteristic associated with the first location and the first time and
  v. a first atmospheric characteristic associated with the first location and the first time;
 d. creating a second data record having details sufficient to identify:
  i. a second time at which the second image was taken,
  ii. the first species of animal,
  iii. the first location,
  iv. a second celestial characteristic associated with the first location and the second time and
  v. a second atmospheric characteristic associated with the first location and the second time;
 e. retrieving a predictive atmospheric data set associated with the first location;
 f. retrieving a predictive celestial data set associated with the first location;
 g. identifying a sequential pattern involving a threatening species wherein the sequential pattern is negatively correlated with the presence of the first species of animal;
 h. gathering a first separate data set from a local camera group;
 i. gathering a second separate data set from a regional camera group;
 j. utilizing the first data record, the second data record, the sequential pattern, the first separate data set and the second separate data set to develop a digital correlation tool and
 k. using the digital correlation tool to evaluate the predictive atmospheric data set and the predictive celestial data set to estimate a probability of the first species of animal being present during a future time period at the first location.

2. A method of evaluating animal activity of claim 1 wherein no human is within 500 feet of the first location at the time the first image is taken.

3. A method of evaluating animal activity of claim 1 wherein an electronic communication is delivered to a portable electronic device indicating a best time to hunt the first species of animal.

4. A method of evaluating animal activity of claim 1 wherein an electronic notification selected from a text message and an email is delivered to a portable electronic device indicating a best time to hunt the first species of animal.

5. A method of evaluating animal activity of claim 1 wherein an electronic communication is delivered to a portable electronic device indicating a best time to hunt the first species of animal and a first person hunts at the first location at the best time to hunt.

6. A method of evaluating animal activity of claim 1 further comprising receiving a time based predictive data set on a portable electronic device and displaying a time based probability chart on the portable electronic device.

7. A method of evaluating animal activity of claim 1 wherein the first celestial characteristic is a solar characteristic.

8. A method of evaluating animal activity of claim 1 wherein the first celestial characteristic is a lunar characteristic.

9. A method of evaluating animal activity of claim 1 wherein the first atmospheric characteristic is an indication of temperature.

10. A method of evaluating animal activity comprising:
 a. positioning a camera in a wildlife activity area;
 b. arranging for the camera to take a series of images in the wildlife activity area including an image of a deer and an image of a threatening species;
 c. conducting an artificial intelligence pattern recognition on the series of images thereby creating camera specific species recognition results;
 d. creating a first data set from the camera specific species recognition results
   i. wherein the first data set identifies the deer by time and location and
   ii. wherein the first data set identifies the threatening species by time and location;
 e. wherein the first data set contains a set of celestial characteristics and a set of atmospheric characteristics;
 f. conducting an analysis of the first data set selected from regression analysis and artificial intelligence pattern matching, the analysis of the first data set comprising:
   i. evaluating a general conditional pattern by matching a predicted instance of atmospheric and celestial conditions to a historical prevalence of deer in similar conditions,
   ii. identifying a sequential pattern positively correlated with the presence of deer,
   iii. evaluating a first correlation strength associated with the sequential pattern positively correlated with the presence of deer,
   iv. identifying a sequential pattern negatively correlated with the presence of deer, and
   v. evaluating a second correlation strength associated with the sequential pattern negatively correlated with the presence of deer; and
 g. displaying a time-based relative probability of sighting deer at a future time incorporating:
   i. the general conditional pattern,
   ii. the sequential pattern positively correlated with the presence of deer,
   iii. the first correlation strength,
   iv. the sequential pattern negatively correlated with the presence of deer, and
   v. the second correlation strength.

11. A method of evaluating animal activity of claim 10 wherein the analysis of the first data set comprises a neural network type artificial intelligence data analysis.

12. A method of evaluating animal activity of claim 10 wherein the analysis of the first data set is combined with an analysis of a local camera group and combined with an analysis of a regional camera group to evaluate a composite time-based relative probability of sighting deer.

13. A method of evaluating animal activity of claim 10 wherein the threatening species is a wild boar.

14. A method of evaluating animal activity of claim 10 wherein the threatening species is a wild boar and the sequential pattern negatively correlated with the presence of deer is based on the recency of the sighting of the wild boar.

15. A method of evaluating animal activity of claim 10 wherein the threatening species is a human.

16. A method of evaluating animal activity of claim 10 wherein the threatening species is a human and the sequential pattern negatively correlated with the presence of deer is based on the recency of the sighting of the human.

17. A method of evaluating animal activity of claim 10 wherein the analysis of the first data set includes an identification and correlation of the co-occurance of two or more co-factors wherein each co-factor is selected from an atmospheric condition and a celestial condition.

* * * * *